(No Model.)

B. F. STEPHENS.
RESERVOIR FOR WATER WORKS.

No. 274,987. Patented Apr. 3, 1883.

Witnesses
Chas. N. Smith
J. Staib

Inventor
B. F. Stephens.
pr Lemuel W. Serrell
atty

UNITED STATES PATENT OFFICE.

BENJAMIN F. STEPHENS, OF BROOKLYN, NEW YORK.

RESERVOIR FOR WATER-WORKS.

SPECIFICATION forming part of Letters Patent No. 274,987, dated April 3, 1883.

Application filed October 9, 1882. (No model.)

*To all whom it may concern:*

Be it known that I, BENJAMIN F. STEPHENS, of Brooklyn, in the county of Kings and State of New York, have invented an Improvement in Reservoirs or Stand-Pipes for Water-Works, of which the following is a specification.

In water-works it is usual to employ reservoirs or stand-pipes. These require cleaning, especially when there is considerable solid matter held in suspension by the water. This has heretofore usually been done by emptying the reservoir or stand-pipe and removing the sediment or muddy water by hand. A man-hole and cover in the side of the stand-pipe have generally been provided to give access for cleaning. This operation causes considerable loss of time and water, and often the pressure or head of water has to be temporarily dispensed with, involving great inconvenience, and often the derangement of manufactories and business interests. I provide a means for removing the sediment while the stand-pipe or reservoir is in use; and to this my invention relates.

Figure 1:
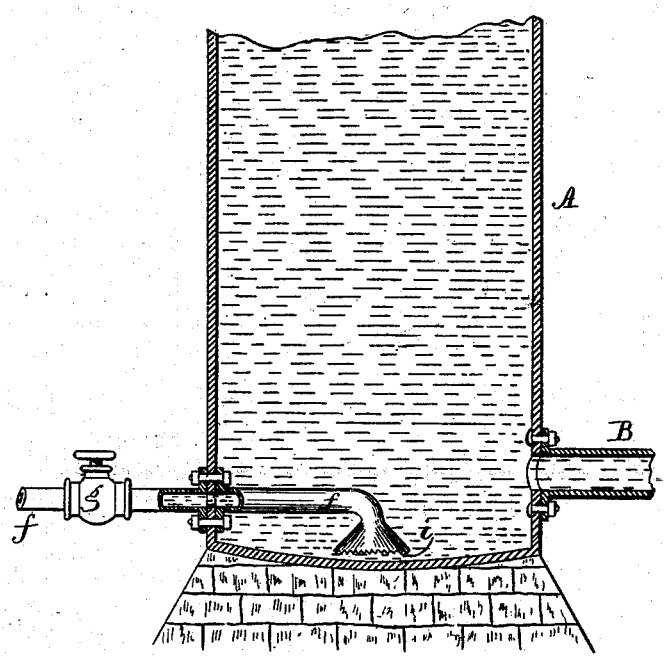
Figure 2:
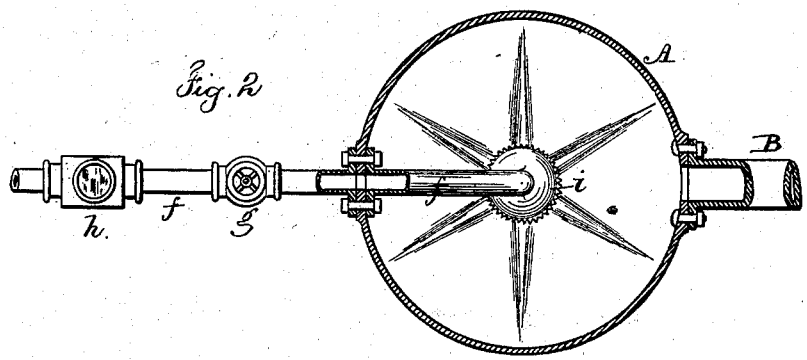
Figure 4:
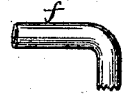
Figure 3:
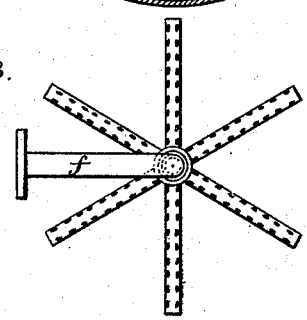

In the drawings, Figure 1 is a vertical section, showing the lower end of a stand-pipe with my improvement applied thereto. Fig. 2 is a plan view, and Figs. 3 and 4 show a modification of the cleansing device.

The reservoir or stand-pipe A is of any desired size or character. B is the inlet-pipe, which may also serve as an outlet-pipe, if desired; or there may be a separate outlet-pipe. The inlet and outlet-pipes should not be too close to the bottom of the reservoir or stand-pipe, in order that the flow of water may not disturb the sediment, and the bottom may be dishing or inclined to the place where the sediment is to be removed.

I make use of an escape-pipe, *f*, and cock *g*, passing off from the reservoir or stand-pipe and leading to a sewer or other place of discharge. The inner end of this pipe *f* is turned downwardly toward the bottom of the reservoir or stand-pipe, and provided with openings or notches as near to the bottom of the reservoir as convenient. I prefer and use the notched end *i* to the pipe, as seen at Fig. 4; but the end of the pipe *f* may terminate as an inverted funnel, as in Figs. 1 and 2, or with branches with holes, as in Fig. 3, by means of which the openings into the pipe *f* may be more or less scattered over the different parts of the bottom of the reservoir or stand-pipe, so that the openings into the pipe *f* will be in the sediment or accumulation at the bottom of the reservoir or stand-pipe. Hence when the valve or cock *g* is opened the pressure of the water will cause such sediment to be driven off through the pipe *f*, and the reservoir cleansed.

In some instances it will be advantageous to have sight-holes containing glass in the discharge-pipe *f*, outside the cock, as at *h*, Fig. 2, so as to be able to ascertain when the discharge-water runs clear.

The sediment-pipe may pass off through the bottom of the stand-pipe, if desired.

I am aware that it is common to employ, in connection with a cistern, a pipe having its lower end provided with a funnel near the bottom of the cistern, and its upper end near the top of said cistern and extending outside the same, so that the water will rise from the bottom part of the cistern and overflow, conveying some of the sediment with it. In this device the water will not overflow any faster than the water runs into the cistern. In my device the column of water exerts the pressure, which, when the cock is opened, causes a rush of water through the discharge-pipe with such force as to carry the sediment and impurities with it.

I claim as my invention—

1. The combination, with the reservoir or stand-pipe, of a sediment-discharge pipe passing in through the side and terminating at or near the bottom of the reservoir or stand-pipe, and provided with openings, and a cock, substantially as set forth.

2. The combination, with the metallic stand-pipe, of a sediment-discharge pipe at the bottom, and a cock or gate, substantially as set forth, whereby the water, in passing out through the sediment-discharge, will convey away earthy and foreign substances from the stand-pipe, substantially as set forth.

Signed by me this 3d day of October, A. D. 1882.

BENJ. F. STEPHENS.

Witnesses:
GEO. T. PINCKNEY,
WILLIAM G. MOTT.